(No Model.)

C. E. GARDINER.
MANUFACTURE OF CANDY WHISTLES.

No. 530,039. Patented Nov. 27, 1894.

Witnesses.
W. R. Edelen.
Ferris Lewis.

Inventor
Clement E. Gardiner,
by Pollok & Mauro,
his attorneys.

UNITED STATES PATENT OFFICE.

CLEMENT E. GARDINER, OF HEMPSTEAD, NEW YORK.

MANUFACTURE OF CANDY WHISTLES.

SPECIFICATION forming part of Letters Patent No. 530,039, dated November 27, 1894.

Application filed September 13, 1894. Serial No. 522,916. (No model.)

*To all whom it may concern:*

Be it known that I, CLEMENT E. GARDINER, of Hempstead, Queens county, New York, have invented new and useful Improvements in the Manufacture of Candy Whistles, which are fully set forth in the following specification.

This invention has reference to the manufacture of whistles from confectioners' paste, or other like plastic material, and has for its object to produce the described articles in a very expeditious and economical manner.

Heretofore candy whistles have been made of various shapes, usually by molding, the air passages being formed by movable cores. Such process of manufacture is, of course, comparatively slow and costly for an article that must be sold very cheaply. The whistles made by my process are different from any candy whistles heretofore made, and as already stated are produced at very small cost in time and labor.

According to my invention the paste is first pressed out or formed into a long hollow rod. This may be, and in practice is, done by means of a machine such as described in Letters Patent No. 478,279, granted to me July 5, 1892; but of course this step of the process may be accomplished by any suitable means. While the paste is still soft, the rod is divided into sections of the desired length by means of a very blunt knife, which not only severs the tube into sections, but at the same time flattens the tube at the cut portions bringing the opposite edges together and causing them to adhere. As the result of this operation we have a number of small hollow articles, of approximately lozenge shape, each of one homogenous piece and entirely inclosed. It remains only to drill a hole through the top and bottom of each hollow lozenge, and the whistle is complete.

The invention will be fully understood from the following description, reference being made to the accompanying drawings, in which—

Figure 1:
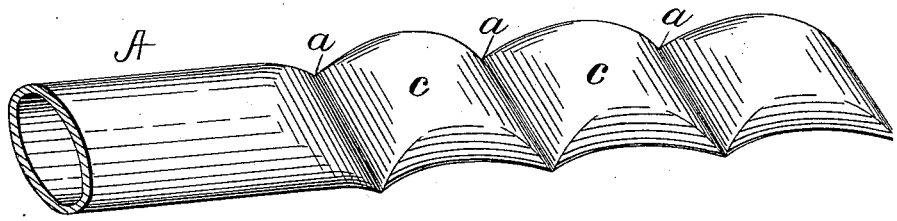
Figure 2:
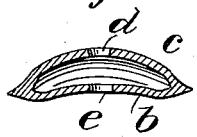

Figure 1 is a perspective view of a series of confection-whistles in process of manufacture, and Fig. 2 is a longitudinal section of a single whistle.

The hollow rod or tube A, from which the whistles are made, is pressed out by machinery (preferably using such as described in the above mentioned patent) using any confectionery-paste or plastic material suitable for the purpose. The hollow rod is laid on a table and divided into sections of suitable length as indicated by the cross-lines $a$, using for this purpose a blunt-edged knife. The knife presses down the upper wall of the tube into contact with the lower wall at the lines where it acts, and as the material is soft and sticky the edges of each section thus brought together adhere, so that the ends of each section are closed. After this step each section or lozenge is a four-sided approximately rectangular figure in plan, with a flat or nearly flat bottom $b$, and an arched top $c$, as clearly shown in the drawings. When sufficiently dried, the lozenge is drilled through by an ordinary drill forming holes $d\,f$ in the top and bottom walls, thus producing a whistle of the type used in speaking tubes.

Having now fully described my invention, I claim—

1. The described process of making whistles, by forming a tube of plastic material, such as confectioners' paste, dividing the plastic tube into sections and at the same time closing the edges of the sections, and finally forming holes in opposite sides of the hollow sections, substantially as set forth.

2. As an article of manufacture, a whistle in the form of a hollow lozenge made from one piece of plastic material, having holes or passages in opposite sides, substantially as described.

In testimony whereof I have signed this specification in the presence of two subscribing witnesses.

CLEMENT E. GARDINER.

Witnesses:
    A. K. GARDINER,
    WALTER PAULY.